United States Patent
Fink

(10) Patent No.: US 11,173,339 B2
(45) Date of Patent: Nov. 16, 2021

(54) EXERCISE APPARATUS AND ASSEMBLIES FACILITATING REMOVABLE ATTACHMENT OF A RESISTANCE DEVICE TO AN EXERCISE APPARATUS

(71) Applicant: Life Fitness, LLC, Mettawa, IL (US)

(72) Inventor: Jeremy L. Fink, Anoka, MN (US)

(73) Assignee: Life Fitness, LLC, Franklin Park, IL (US)

( * ) Notice: Subject to any disclaimer, the term of this patent is extended or adjusted under 35 U.S.C. 154(b) by 0 days.

(21) Appl. No.: 16/454,300

(22) Filed: Jun. 27, 2019

(65) Prior Publication Data

US 2021/0106866 A1 Apr. 15, 2021

(51) Int. Cl.
*A63B 21/00* (2006.01)
*A63B 21/062* (2006.01)

(52) U.S. Cl.
CPC ...... *A63B 21/4035* (2015.10); *A63B 21/0628* (2015.10); *A63B 21/154* (2013.01); *A63B 21/155* (2013.01); *A63B 21/153* (2013.01); *A63B 2208/0233* (2013.01)

(58) Field of Classification Search
CPC ............ A63B 21/4035; A63B 21/0628; A63B 21/154; A63B 21/155; A63B 21/156; A63B 21/151; A63B 21/152; A63B 21/153; A63B 2208/0233; A63B 2022/0079; A63B 2069/062; B66D 3/04; B66D 3/26; B65H 75/28; Y10T 403/7015; Y10T 403/559; Y10T 403/60; Y10T 403/602; Y10T 403/604

USPC ............... 254/390, 403, 405; 242/402, 587; 248/332

See application file for complete search history.

(56) References Cited

U.S. PATENT DOCUMENTS

| | | | | |
|---|---|---|---|---|
| 2,225,845 | A | * 12/1940 | Richolt | ................ F16G 11/046 74/98 |
| 3,640,527 | A | * 2/1972 | Proctor | ............. A63B 21/4047 482/100 |
| 4,241,715 | A | 12/1980 | Jennings | |
| 4,333,443 | A | 6/1982 | Roelle | |
| 4,515,363 | A | * 5/1985 | Schleffendorf | ...... A63B 21/155 482/100 |
| 4,627,614 | A | * 12/1986 | de Angeli | ........ A63B 21/00072 482/138 |

(Continued)

OTHER PUBLICATIONS

Extended European Search Report for EP 20182550.2, dated Nov. 16, 2020.

*Primary Examiner* — Megan Anderson
*Assistant Examiner* — Kathleen Vermillera
(74) *Attorney, Agent, or Firm* — Andrus Intellectual Property Law, LLP

(57) ABSTRACT

Assemblies are for attaching a resistance mechanism to an exercise apparatus. In one example, the assembly has a pulley cable having a first end portion for being coupled to the resistance mechanism and a second end portion coupled to the exercise apparatus; and a plunger device facilitating coupling and uncoupling of the pulley cable to and from the exercise apparatus. The plunger device is movable into a first position in which the plunger device couples the pulley cable to the exercise apparatus and into a second position in which the plunger device uncouples the pulley cable from the exercise apparatus.

18 Claims, 9 Drawing Sheets

(56) References Cited

U.S. PATENT DOCUMENTS

| | | | | |
|---|---|---|---|---|
| 4,834,367 A * | 5/1989 | Salyer | A63B 21/155 | |
| | | | 482/100 | |
| 4,953,855 A * | 9/1990 | Shields | A63B 21/155 | |
| | | | 482/99 | |
| 4,988,098 A * | 1/1991 | Miller | A63B 23/1245 | |
| | | | 482/99 | |
| 5,087,031 A * | 2/1992 | Hoff | A63B 23/129 | |
| | | | 482/46 | |
| 5,088,726 A * | 2/1992 | Lapcevie | A63B 21/00072 | |
| | | | 482/97 | |
| 5,094,449 A * | 3/1992 | Stearns | A63B 21/154 | |
| | | | 482/100 | |
| 5,102,121 A * | 4/1992 | Solow | A63B 21/155 | |
| | | | 482/137 | |
| 5,242,347 A | 9/1993 | Keeton | | |
| 5,580,341 A * | 12/1996 | Simonson | A63B 23/1254 | |
| | | | 482/100 | |
| 5,776,040 A * | 7/1998 | Webb | A63B 21/154 | |
| | | | 482/98 | |
| 5,833,535 A * | 11/1998 | Williams | A63B 23/085 | |
| | | | 482/80 | |
| 6,527,683 B2 * | 3/2003 | Tolles | A63B 21/152 | |
| | | | 482/103 | |
| 6,676,574 B1 | 1/2004 | Prokop et al. | | |
| 6,719,672 B1 * | 4/2004 | Ellis | A63B 21/155 | |
| | | | 482/98 | |
| 7,101,327 B1 | 9/2006 | Baumler et al. | | |
| 7,377,887 B1 | 5/2008 | Rosenow et al. | | |
| 7,537,551 B2 | 5/2009 | Steffee | | |
| 7,717,833 B1 * | 5/2010 | Nelson | A63B 21/4047 | |
| | | | 482/100 | |
| 7,749,140 B1 | 7/2010 | Lindemeier et al. | | |
| 8,591,386 B2 | 11/2013 | Meyer | | |
| 9,192,800 B1 | 11/2015 | Meyer et al. | | |
| 9,480,869 B1 | 11/2016 | Meyer et al. | | |
| 9,492,702 B1 | 11/2016 | Atwood | | |
| 2007/0161470 A1 * | 7/2007 | Berryman | A63B 21/00072 | |
| | | | 482/94 | |
| 2008/0176722 A1 * | 7/2008 | Steffee | A63B 21/0628 | |
| | | | 482/98 | |
| 2009/0179118 A1 | 7/2009 | Denmark | | |

* cited by examiner

EXERCISE APPARATUS AND ASSEMBLIES FACILITATING REMOVABLE ATTACHMENT OF A RESISTANCE DEVICE TO AN EXERCISE APPARATUS

FIELD

The present disclosure relates to exercise apparatuses, and more particularly to assemblies for attaching a resistance device to an exercise apparatus.

BACKGROUND

U.S. Pat. Nos. 9,192,800 and 9,480,869 are incorporated herein by reference and disclose exercise equipment including a weight stack configured to oppose a given exercise motion through a cable and pulley system and an elongated connector connecting the cable to a weight stack. The elongated connector has a first threaded portion located proximate to the weight stack and a second portion located distal from the weight stack. The first threaded portion is engaged with the weight stack and has a diameter that is greater than a diameter of the second portion such that an operator can visually determine whether the connector is fully engaged with a threaded receptacle in the weight stack.

U.S. Pat. No. 8,591,386 is incorporated herein by reference and discloses a connection assembly for connecting a user-coupled link to a resistance-bearing cable in exercise apparatus. An inner collar is provided in an axial gap between an outer collar and a barrel engaging the cable. A removal method is provided facilitating low cost component replacement.

U.S. Pat. No. 7,749,140 is incorporated herein by reference and discloses a quick disconnect and re-connect system for an exercise apparatus having a connection assembly for connecting a user-gripped handle to a resistance-bearing cable.

U.S. Pat. Nos. 9,492,702; 7,717,833; 7,537,551; 7,377,887; 7,101,327; 6,527,683 and 6,676,574 are also incorporated herein by reference.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter. As further described herein below, the present disclosure provides an assembly for attaching a resistance mechanism to an exercise apparatus. The assembly has a pulley cable with a first end portion coupled to the resistance mechanism and a second end portion coupled to the exercise apparatus; and a plunger device facilitating coupling and uncoupling of the pulley cable to and from the exercise apparatus. The plunger device is movable into a first position in which the plunger device couples the pulley cable to the exercise apparatus and into a second position in which the plunger device uncouples the pulley cable from the exercise apparatus.

BRIEF DESCRIPTION OF THE DRAWINGS

The present disclosure is described with reference to the following Figures. The same numbers are used throughout the Figures to reference like features and like components. Unless otherwise specifically noted, articles depicted in the drawings are not necessarily drawn to scale.

DETAILED DESCRIPTION OF THE DRAWINGS

Figure 1:
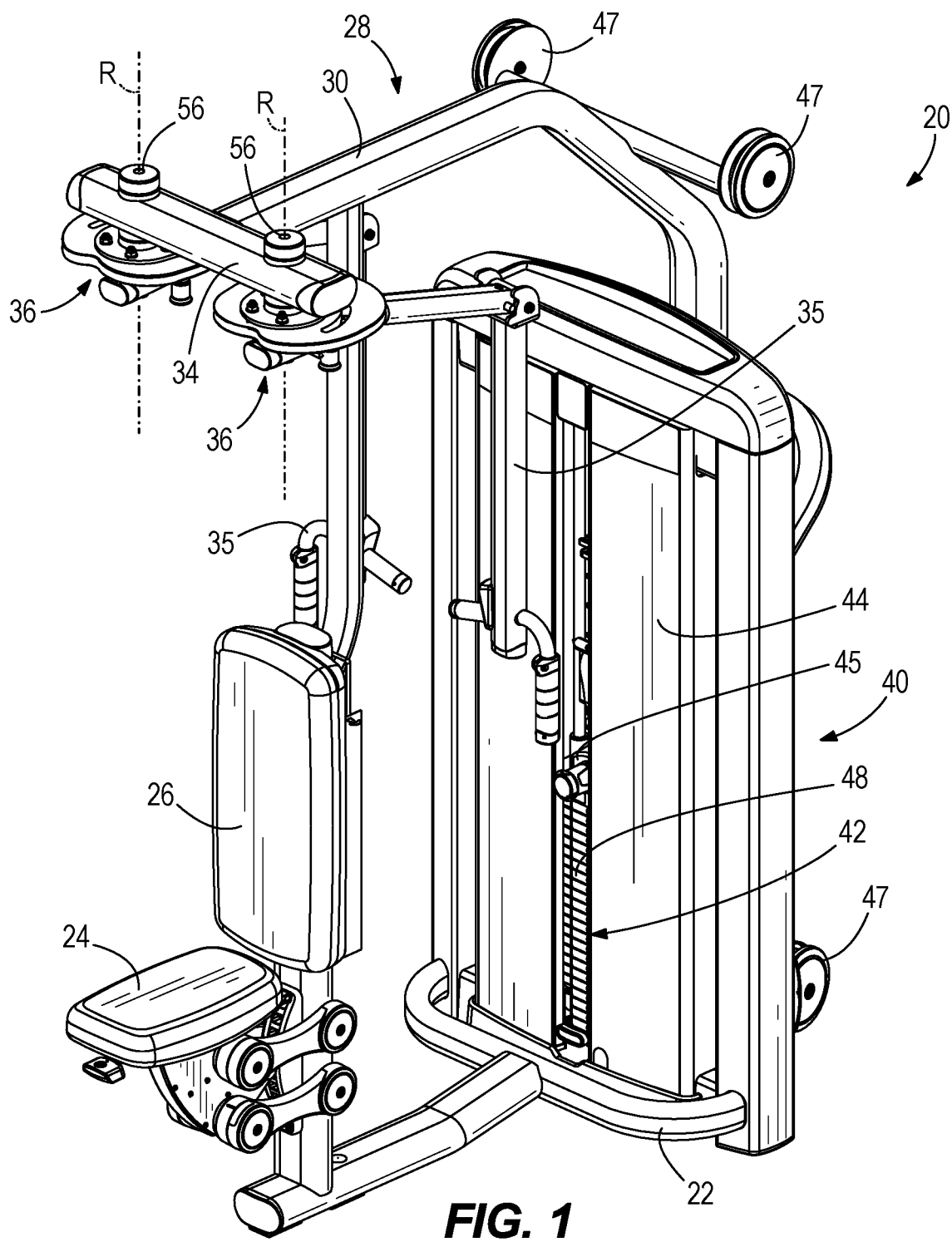
FIG. 1 is a perspective view of a prior art exercise apparatus.

FIG. 1 depicts a conventional exercise apparatus 20 for performing weight training using a pulley cable system. As would be understood by one having ordinary skill in the art, the exercise apparatus 20 has a base frame 22 that support a seat 24 and backrest 26 above the ground. An overhead support frame 28 has an arched arm 30 and a crossbar 34. The arched arm 30 and the crossbar 34 together form a T-shape. The outer ends of the crossbar 34 support user operable members in the form of a pair of handlebars 35. The handlebars 35 are operable by a user sitting on the seat 24 and are for performing a chest press exercise motion. The upper ends of the handlebars 35 are coupled to the ends of the crossbar 34 by rotatable pulley members 36, which in turn are coupled to pulley cables 38, as shown in more detail in FIG. 2 and further described herein below. The base frame 22 also supports a resistance mechanism 40 configured to resist the noted chest press exercise motion. The resistance mechanism includes a weight stack 42 supported within a housing 44. The weight stack 42 is a conventional mechanism configured like any one or a combination of the various weight stacks disclosed in the above-incorporated U.S. patents. In general, the weight stack 42 has a head plate 45 connected to a bayonet (not shown) that is coupled to first ends of the pulley cables 38, which for example can be routed from the rotatable pulley members 36 to the head plate 45 via various pulley wheels 47. The bayonet is also a conventional apparatus that is received in a center-bore extending through the weight stack 42 and has a series of lateral engagement holes for engagement by a selector pin. Manually removing and inserting the selector pin into one of a plurality of lateral selector holes 48 in the weight stack 42 and corresponding lateral engagement hole in the bayonet allows the user to adjust the amount of resistance (i.e. weight) applied to the handlebars 35 via the pulley cable 38 and rotatable pulley members 36 all as is conventional and disclosed in several of the above-incorporated U.S. patents.

Movement of the handlebars 35 rotates the rotatable pulley member 36 and thereby pulls on the pulley cables 38, which in turn is resisted by the selected weights in the weight stack 42.

It should be noted that the exercise apparatus 20 depicted in FIG. 1 is exemplary, and the concepts of the present disclosure are not limited for use with the particular exercise apparatus shown in the figures.

Figure 2:
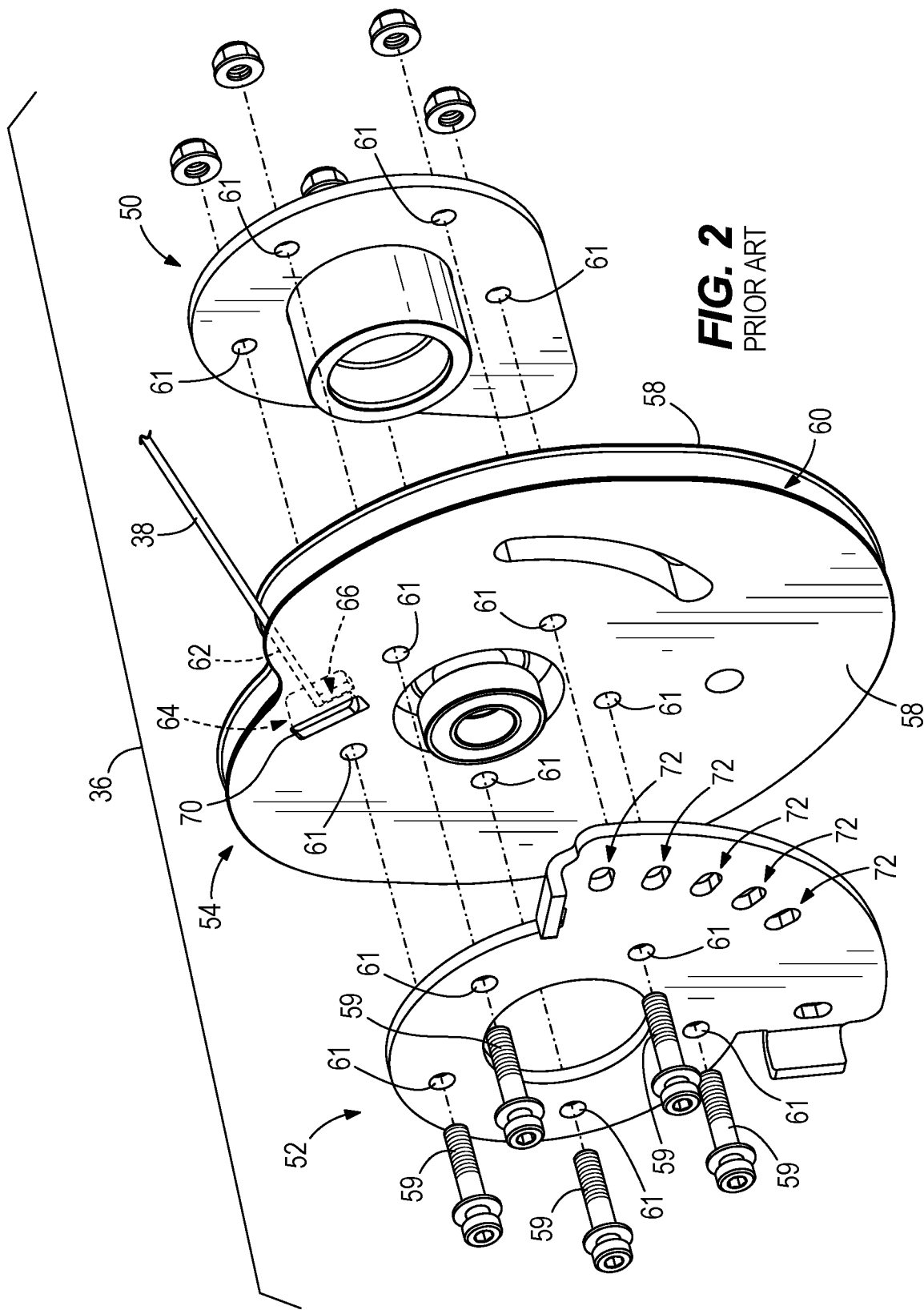
FIG. 2 is an exploded view of a prior art rotatable pulley member and a pulley cable coupled to the rotatable pulley member.

FIG. 2 depicts the rotatable pulley member 36 in exploded view. The rotatable pulley member 36 has a hub 50, a selector plate 52, and a cam member 54 located axially between the hub 50 and selector plate 52. The hub 50, selector plate 52 and cam member 54 are concentrically aligned and rotatable together about a center-shaft 56 (see FIG. 1). The hub 50, selector plate 52 and cam member 54 are coupled together by fasteners 59 that axially extend through aligned holes 61 therein. The center-shaft 56 is coupled to the crossbar 34 and the rotatable pulley member 36 is rotatable about an axis R defined by the center-shaft 56.

As shown in FIG. 2, cam member 54 has opposing cam plates 58 that are spaced apart from each other such that a radially outer recessed groove 60 is formed there between. The pulley cable 38 has a second end portion 62 that extends into the recessed groove 60 and is coupled to the opposing cam plates 58 by a metal U-shaped member 64 having a locking groove 66 in which the second end portion 62 of the pulley cable 38 resides. The locking groove 66 is wide enough to accommodate the width of the pulley cable 38 but small enough to not allow passage of an enlarged end 68 (see FIG. 4) of the second end portion 62 of the pulley cable 38. The enlarged end 68 has a larger width than the body of the pulley cable 38. In the illustrated example, the enlarged end 68 is a swaged ball-end. The U-shaped member 64 is nested in a cavity 70 formed into and/or through one or both of the opposing cam plates 58 such that the pulley cable 38 rides along the radially outer recessed groove 60 when the cam member 54 is rotated about the axis R. The selector plate 52 has a series of selector apertures 72 into which a selector pin (not shown) is manually inserted to select a resistance profile provided by engagement of the pulley cable 38 along the recessed groove 60, and/or to adjust the position of handlebars 35 to better suit the arm length of the user and/or to change the exercise motion of the user, all as is known and conventional in the art.

During research and experimentation, the present inventor has found it can be difficult and/or time-consuming to assemble, disassemble, repair and/or otherwise service the rotatable pulley member 36. In particular, it can be difficult and/or time consuming to assemble, disassemble, repair and/or replace the coupling between the second end portion 62 of the pulley cable 38 and the opposing cam plates 58. In certain instances, the rotatable pulley member 36 can be located in hard-to-reach or otherwise hard to service locations, such as on the overhead support frame 28 shown in FIG. 1, on the base frame 22 (i.e. closer to the ground), and/or other similar locations. In certain instances, assembly, disassembly, repair and/or replacement of the rotatable pulley member 36 requires removal of the fasteners 59 with a manual tool such as a screwdriver and removal of at least the selector plate 52, which can be difficult and/or time-consuming. In certain instances, a technician will inadvertently incorrectly reassemble the components, which could pose a risk that the exercise apparatus 20 is used with the second end portion 62 of the pulley cable 38 is not fully or not correctly coupled to the rotatable pulley member 36. Upon these realizations, the present inventor conceived of the presently disclosed inventive concepts, illustrated in FIGS. 3-12, which in particular overcome the above-noted deficiencies of the prior art.

Figure 3:
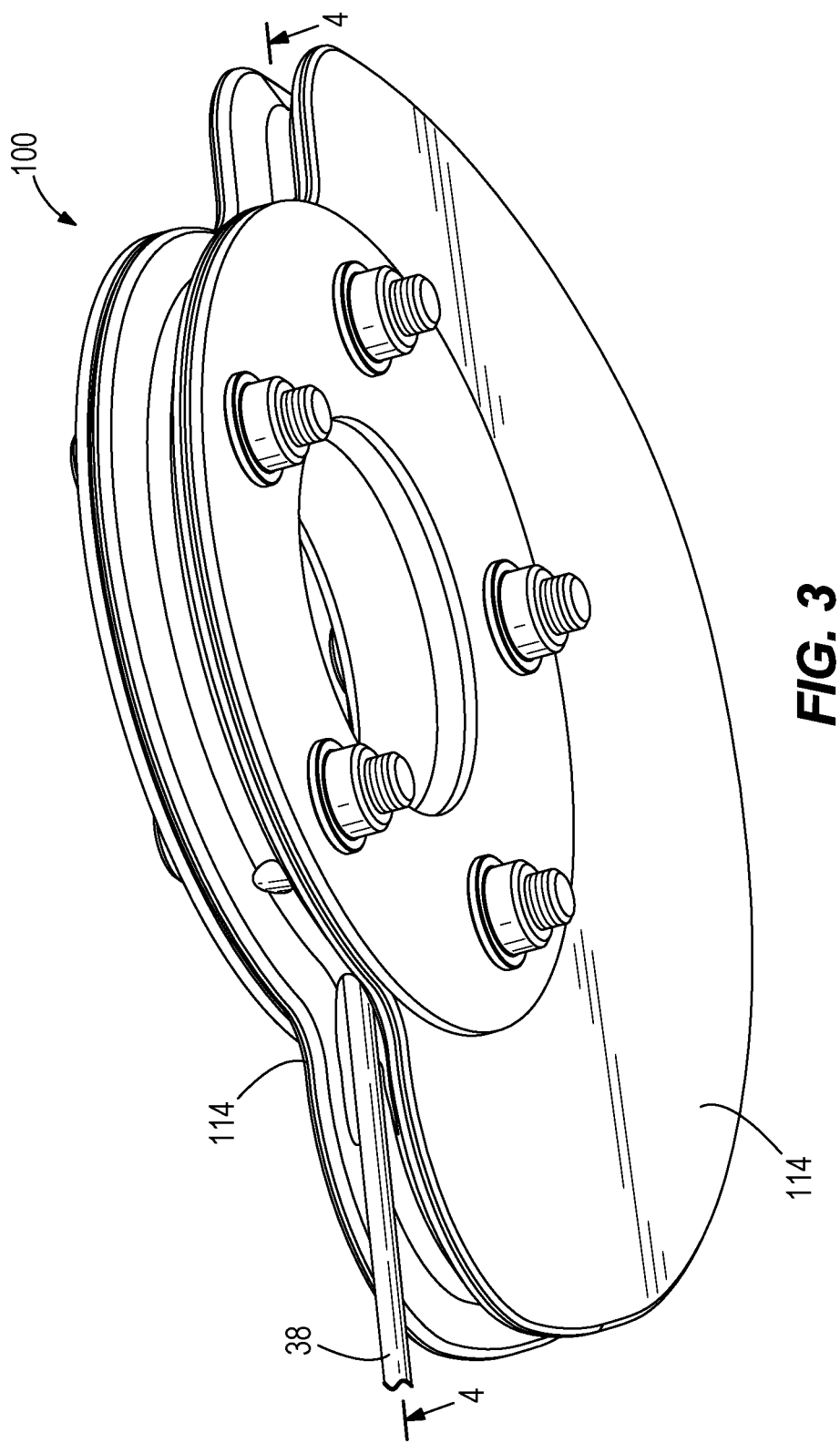
FIG. 3 is a rotatable pulley member and pulley cable according to a first embodiment of the present disclosure.
Figure 4:
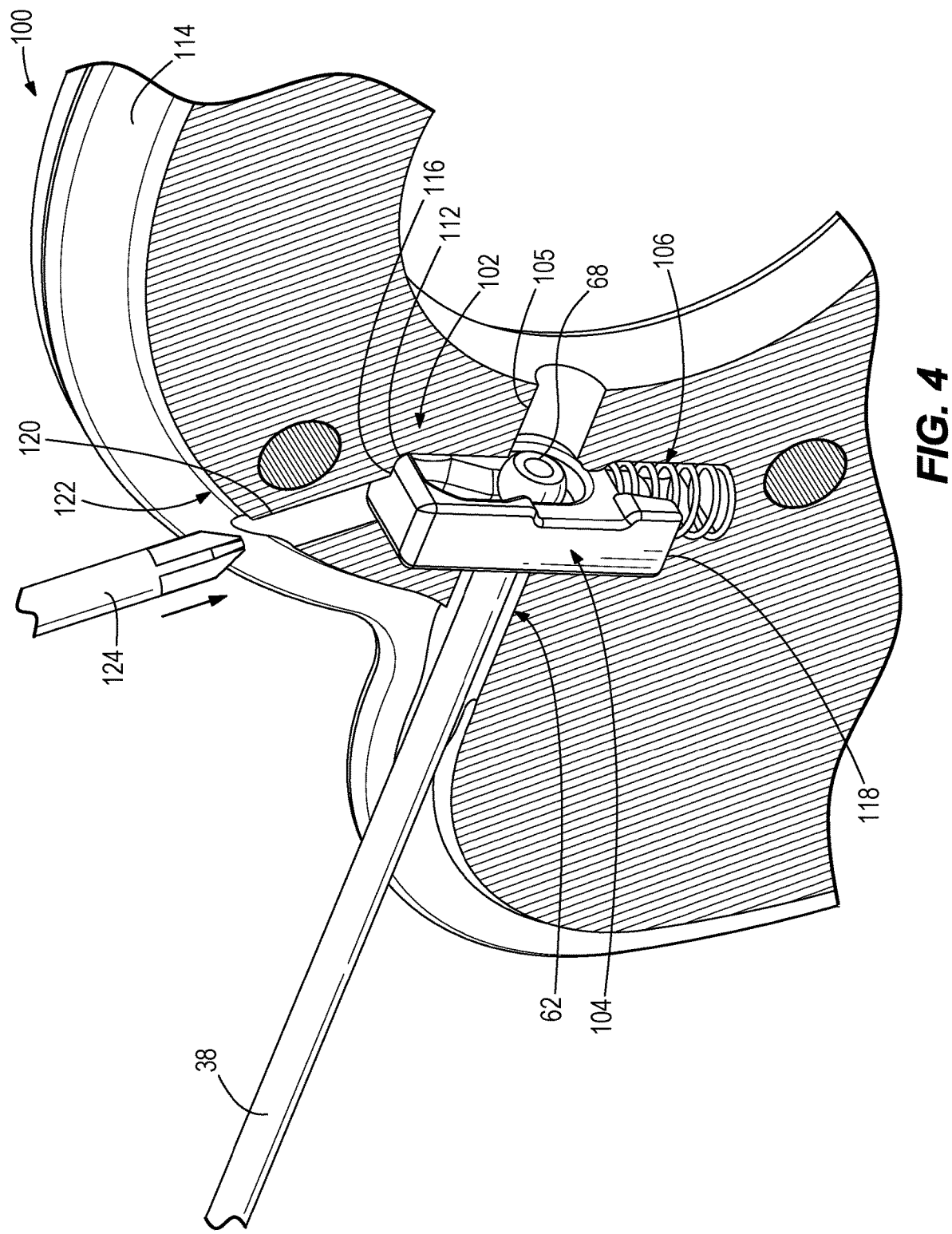
FIG. 4 is a view of section 4-4, taken in FIG. 3.
Figure 5:
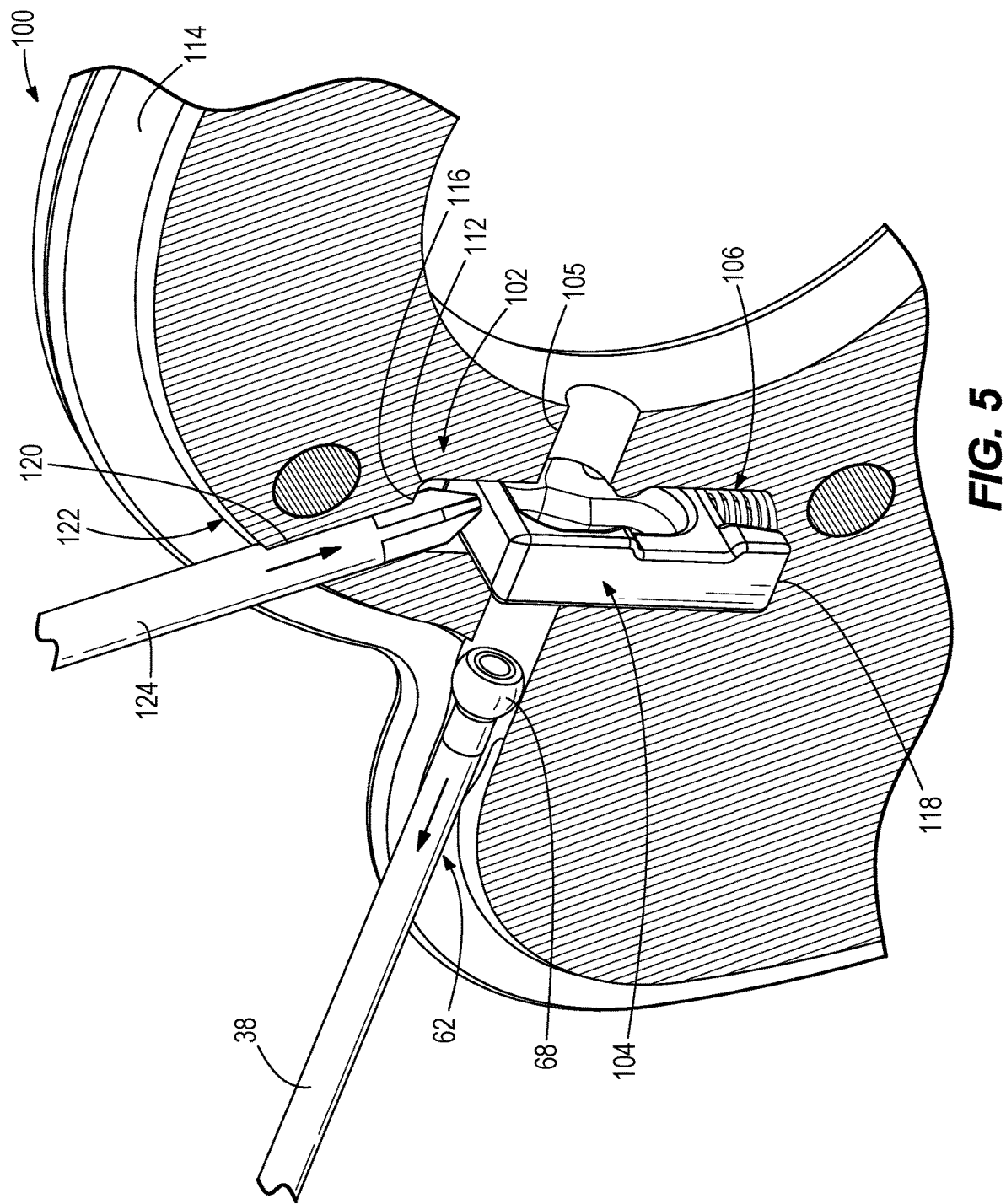
FIG. 5 is a view like FIG. 4, depicting insertion of a manual tool for uncoupling the pulley cable from the rotatable pulley member.

FIGS. 3-5 depict a first embodiment of a rotatable pulley member 100 for use with an exercise apparatus, including for example the exercise apparatus 20 shown in FIG. 1. The rotatable pulley member 100 has a novel plunger device 102 which compared to the prior art better facilitates coupling and uncoupling of the second end portion 62 of the pulley cable 38 to and from the rotatable pulley member 100. The plunger device 102 is shown in more detail in FIGS. 6 and 7 and will be further described herein below.

FIG. 4 depicts the plunger device 102 in a first position in which the plunger device 102 couples the second end portion 62 of the pulley cable 38 to the rotatable pulley member 100. FIG. 5 depicts the plunger device 102 in a second position in which the second end portion 62 of the pulley cable 38 is uncoupled and thus free to be manually removed from the rotatable pulley member 100. The plunger device 102 is movable from the first position into the second position via for example a manual tool 124. In an alternate embodiment, the plunger device 102 is itself manually movable, as will be described herein below with reference to FIGS. 10-12. As will be further described herein below, the enlarged end 68 of the pulley cable 38 is engaged with the plunger device 102 in the first position (FIG. 4) so as to lock the second end portion 62 with respect to the rotatable pulley member 100. The enlarged end 68 of the pulley cable 38 is disengaged from the plunger device 102 in the second position (FIG. 5) so as to unlock the second end portion 62 with respect to the rotatable pulley member 100.

Referring to FIGS. 4 and 5, the plunger device 102 includes a monolithic plunger body 104 and a biasing device 106 that biases the plunger device 102 into the first position (FIG. 4). The type and configuration of the biasing device 106 can vary from what is shown and described. In the illustrated example, the biasing device 106 includes a spring, and more particularly a compression spring having a first end engaged with the plunger body 104 and an opposite second end engaged with an internal wall of the rotatable pulley member 100. The type and configuration of the spring can vary from what is shown. In the illustrated example, the plunger body 104 is disposed in an elongated cavity 112 defined between opposing cam plates 114 of the rotatable pulley member 100. The biasing device 106 is disposed between the plunger body 104 and an end wall of the elongated cavity 112. The biasing device 106 biases the plunger body 104 towards a first end 116 of the elongated cavity 112. By comparison of FIGS. 4 and 5, it can be seen that the plunger body 104 is movable against the bias force of the biasing device 106 towards an opposite, second end 118 of the elongated cavity 112. A radial groove 120 extends through one or both of the opposing cam plates 114, from the radially outer edge 122 of the opposing cam plates 114 to the elongated cavity 112, and allows for insertion of the manual tool 124, such as the screwdriver shown in the figure, thereby facilitating manual actuation (i.e., movement) of the plunger body 104 via the manual tool 124, in particular to thereby move the plunger body 104 towards and into the second position (FIG. 5), against the bias of the spring. As explained above, the biasing device 106 biases the plunger body 104 back towards the first position (FIG. 4), against the force of the manual tool 124, when the manual tool 124 is removed.

Figure 7:
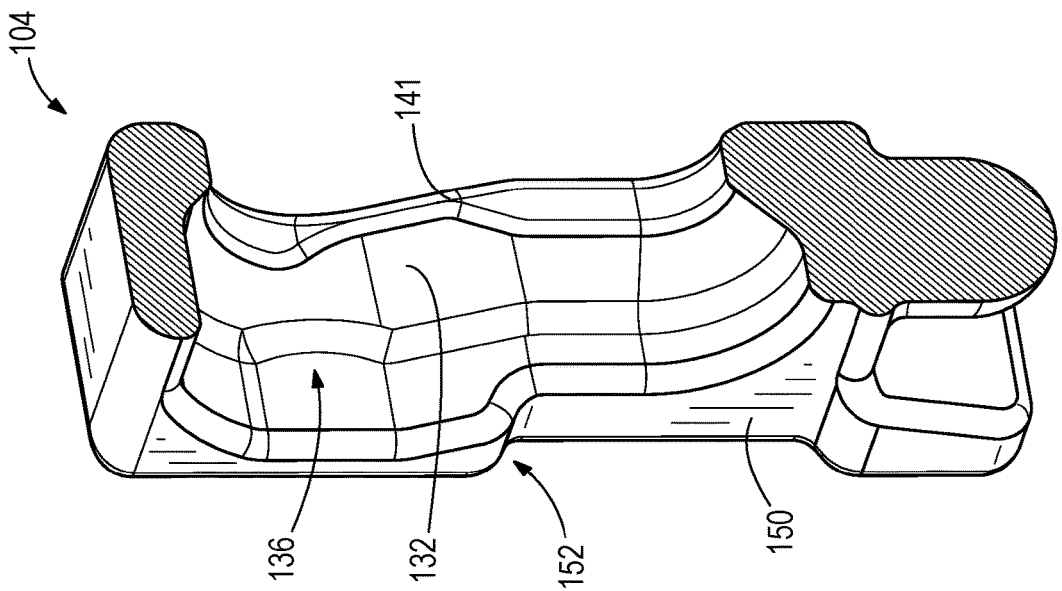
FIG. 7 is a view of section 7-7, taken in FIG. 6.
Figure 6:
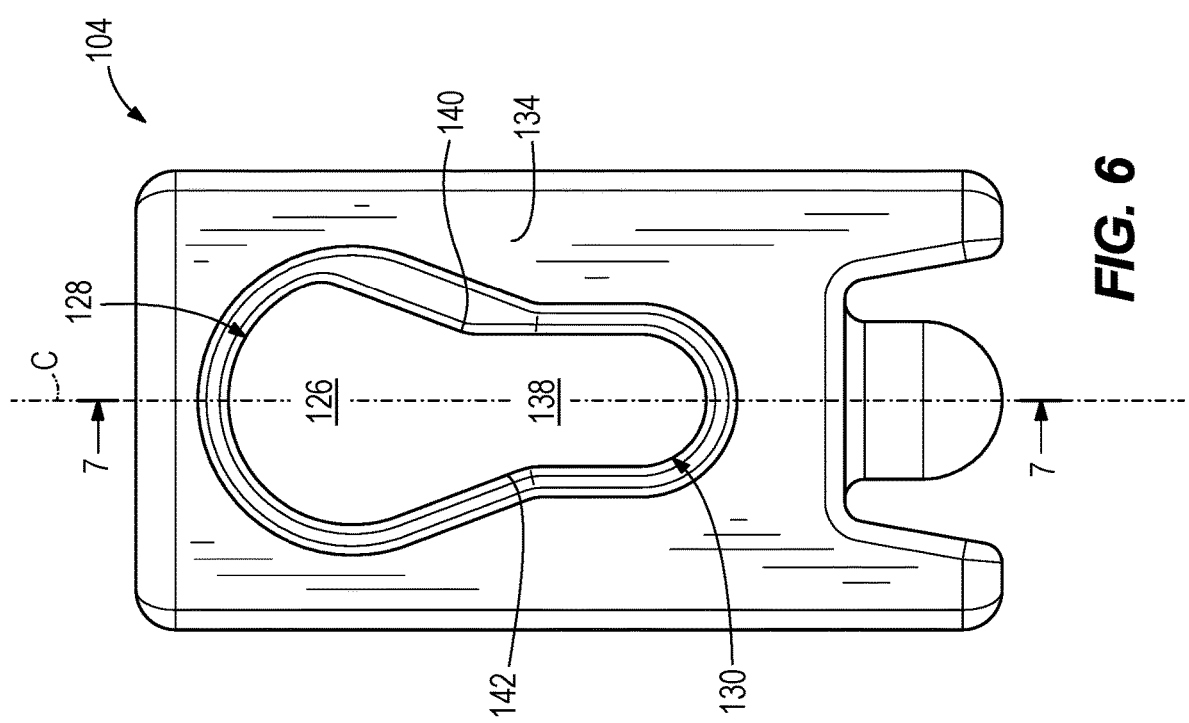
FIG. 6 is a front view of a first embodiment of a plunger device according to the present disclosure, facilitating coupling and uncoupling of the pulley cable to and from the rotatable pulley member.

Referring to FIGS. 6 and 7, the plunger body 104 has a keyhole aperture 126 having a first end 128 through which the enlarged end 68 of the pulley cable 38 is free to pass and a second end 130 through which the enlarged end 68 of the pulley cable 38 cannot pass. By comparing FIGS. 8 and 9, it will be seen that when the plunger body 104 is moved from the first position (FIG. 9) into the second position (FIG. 8), the first end 128 of the keyhole aperture 126 becomes aligned with a radial through-bore 105 (see also FIGS. 4 and 5) in the rotatable pulley member 100 into which the pulley cable 38 is disposed. Conversely, when the plunger body 104 is allowed to move under force of the biasing device 106 into the first position (FIG. 9), the second end 130 of the keyhole aperture 126 becomes aligned with the radial through-bore 105 and thus as described above the plunger body 104 prevents the pulley cable 38 from passing therethrough, thus securely coupling the pulley cable 38 to the rotatable pulley member 100.

Thus, as shown and described, the present disclosure provides a relatively straight-forward solution to a problem in the art that has not yet been solved or even recognized. The present disclosure provides a novel solution that advantageously allows the technician to quickly assemble, disassemble, repair and/or otherwise service the pulley cable 38 and rotatable pulley member 36, without requiring time-consuming and problematic steps such as disassembly of the rotatable pulley member 36.

During further research and development, the present inventor has determined that it would be desirable to configure the presently disclosed embodiments in a way that better ensures that the pulley cable 38 is securely coupled to the rotatable pulley member 36 prior to use of the exercise apparatus 20. More specifically, the present inventor determined that it would be desirable to configure the plunger body 104 in a way that avoids a false engagement between the pulley cable 38 and the rotatable pulley member 36, i.e., so that the pulley cable 38 does not unexpectedly uncouple from the rotatable pulley member 36 during subsequent use of the exercise apparatus 20.

Figure 9:
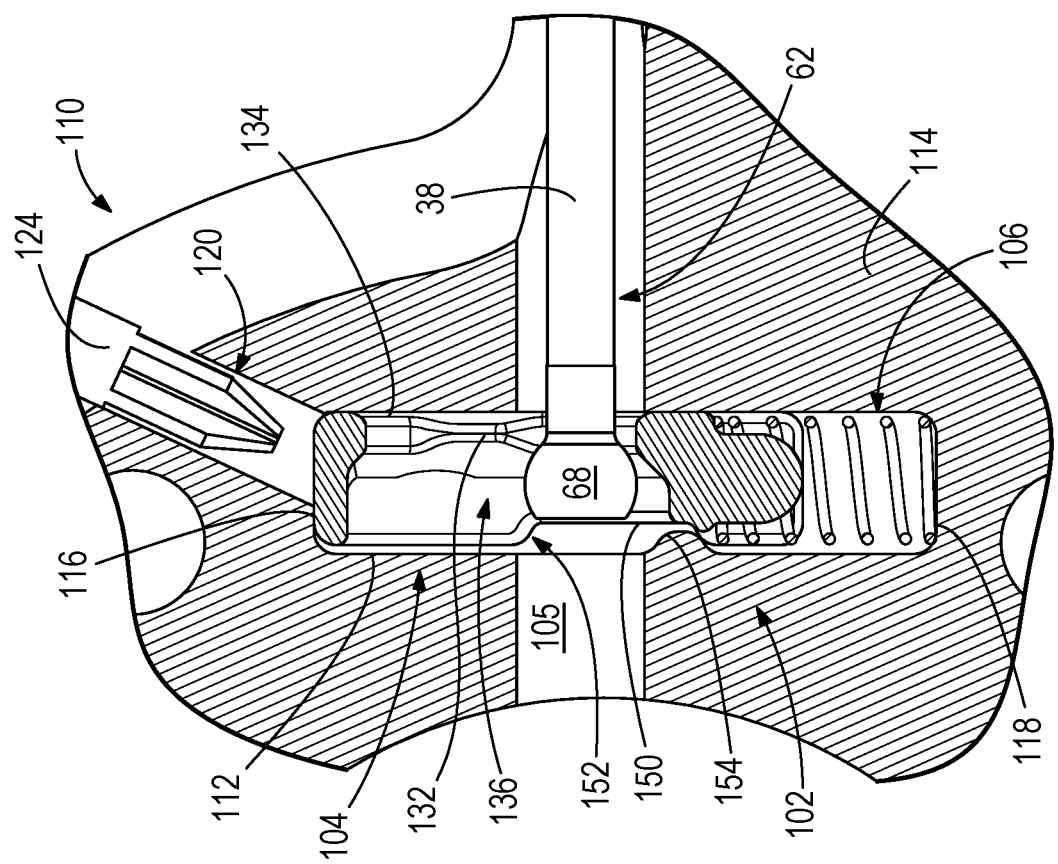
FIGS. 8 and 9 are sectional views of the first embodiment sequentially depicting insertion of the manual tool for uncoupling the pulley cable from the rotatable pulley member.
Figure 8:
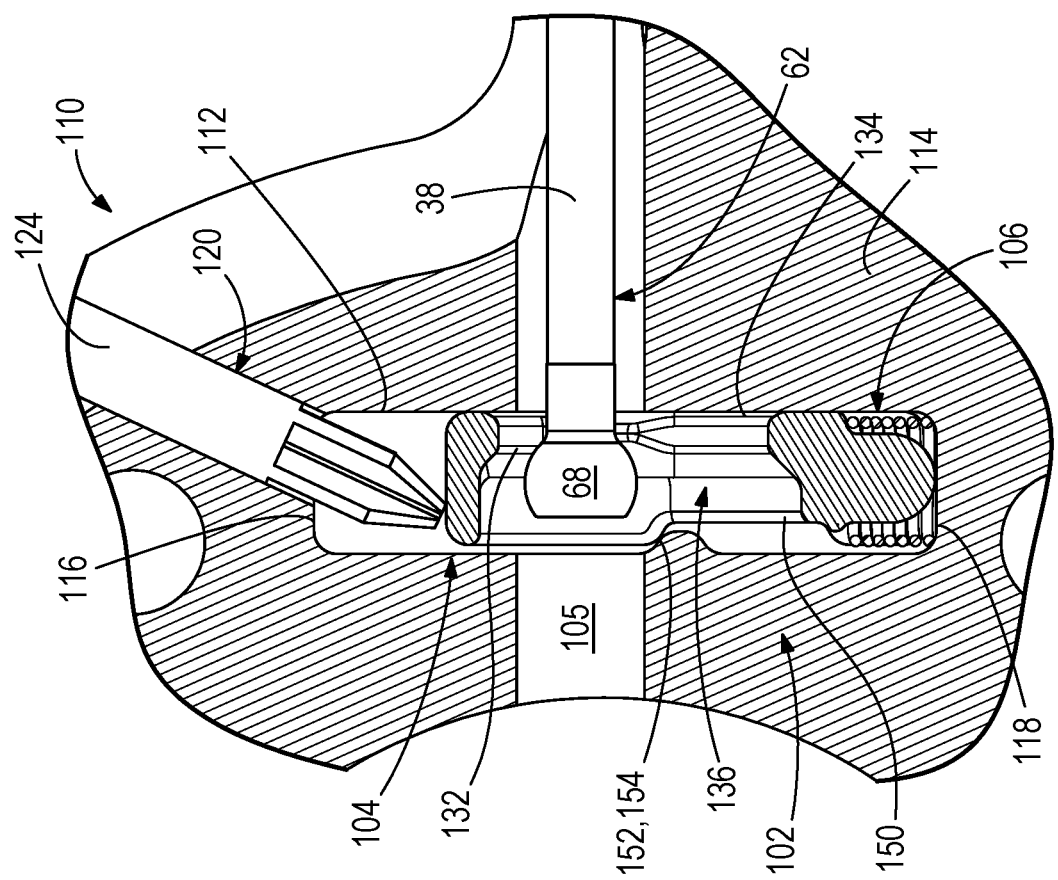

Referring to FIGS. 8 and 9, the plunger body 104 has a inner rear surface 132 that engages with the enlarged end 68 when the plunger body 104 is in the first position (FIG. 9) and the second end 130 of the keyhole aperture 126 is aligned with the radial through-bore 105. The plunger body 104 also has an opposite, front surface 134. A cavity 136 is formed in the plunger body 104. The inner rear surface 132 is located in the cavity 136, and particularly around the keyhole aperture 126. When the second end portion 62 of the pulley cable 38 is coupled to the rotatable pulley member 100, the enlarged end 68 of the pulley cable 38 is located in the cavity 136 and abuts the inner rear surface 132 around the second end 130 of the keyhole aperture 126. The cavity 136 helps ensure that the enlarged end 68 of the pulley cable 38 remains within the outer extent of the plunger body 104, thus preventing jamming and/or false engagement between the enlarged end 68, the plunger body 104 and the walls of the radial through-bore 105 and/or elongated cavity 112 of the rotatable pulley member 100. The cavity 136 also allows the swaged ball end of the pulley cable 38 to rotate or pivot when engaging with the plunger body 104, thus further preventing jamming and/or false engagement.

Referring to FIG. 6, the keyhole aperture 126 has a funnel portion 138 located between the first end 128 and second end 130 and transitioning the first end 128 to the second end 130. The funnel portion 138 is defined by opposing first and second tapered sides 140, 142 that each taper inwardly towards the other as the tapered sides 140, 142 extend along the first end 128 to the second end 130. The first and second tapered sides 140, 142 are non-symmetrical with respect to each other and with respect to a center axis C extending through first and second ends 128, 130 of the keyhole aperture 126. Also, the first tapered side 140 has a narrower leading edge 141 (see FIG. 7) than the second tapered side 142. The first tapered side 140 is tapered at a greater angle from the first end 128 to the second end 130 compared to the second tapered side 142. The non-symmetrical taper of the funnel portion 138, and particularly the non-symmetrical nature of the first and second tapered sides 140, 142 encourages instability of the enlarged end 68 of the pulley cable 38. In other words, the non-symmetrical configuration encourages the enlarged end 68 to fall in or out of the cavity 136 across the funnel portion 138, as shown in FIGS. 8, 9. That is, the enlarged end 68 is encouraged to fall into the cavity 136, or out of the cavity 136 into the radial through-bore 105 and into a position in which the technician can clearly see that the second end portion 62 of the pulley cable 38 is not coupled to the rotatable pulley member 100.

As shown in FIGS. 8 and 9, the plunger body 104 has an outer rear surface 150 that includes an outer shoulder 152 that nests with a corresponding inner shoulder 154 formed in the elongated cavity 112 of the rotatable pulley member 100. The opposing front surface 134 does not have a shoulder corresponding to the outer shoulder 152. The shoulders 152, 154, and the lack of a corresponding shoulder on the front surface 134 ensures that the plunger body 104 is installed into the elongated cavity 112 in the proper orientation shown in the figures, as opposed to being installed backwards. That is, the shoulders 152, 154 prevent the plunger body 104 from fitting into a nested position in the elongated cavity 112 in a backwards orientation compared to what is shown in the figures.

Figure 11:
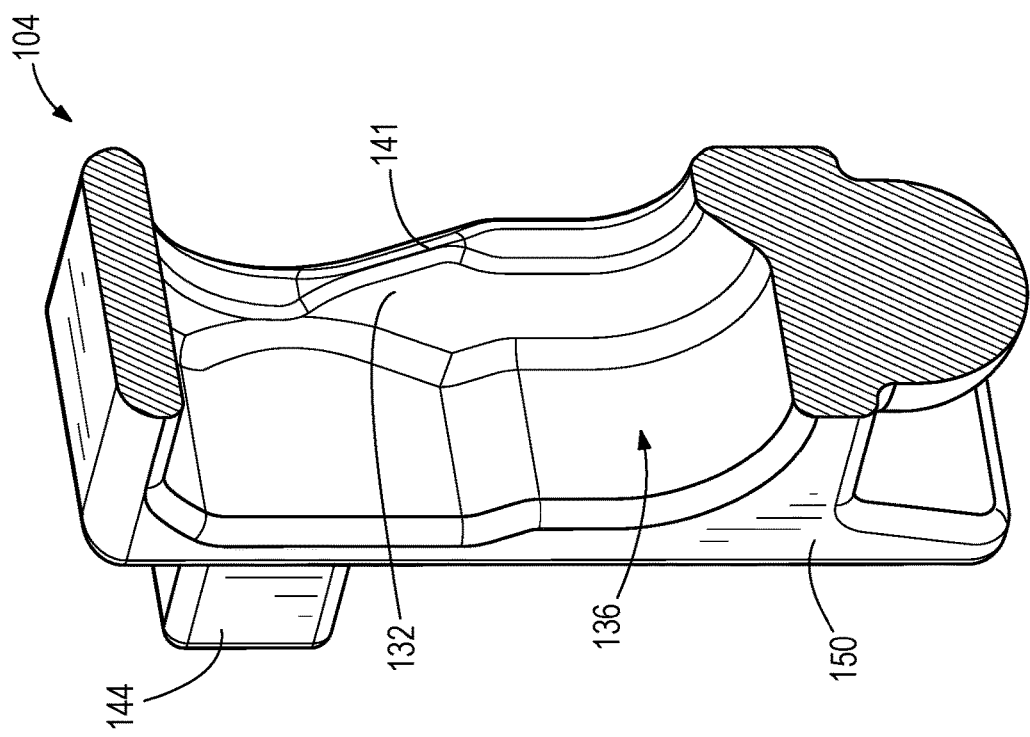
FIG. 11 is a view of section 11-11, taken in FIG. 10.
Figure 10:
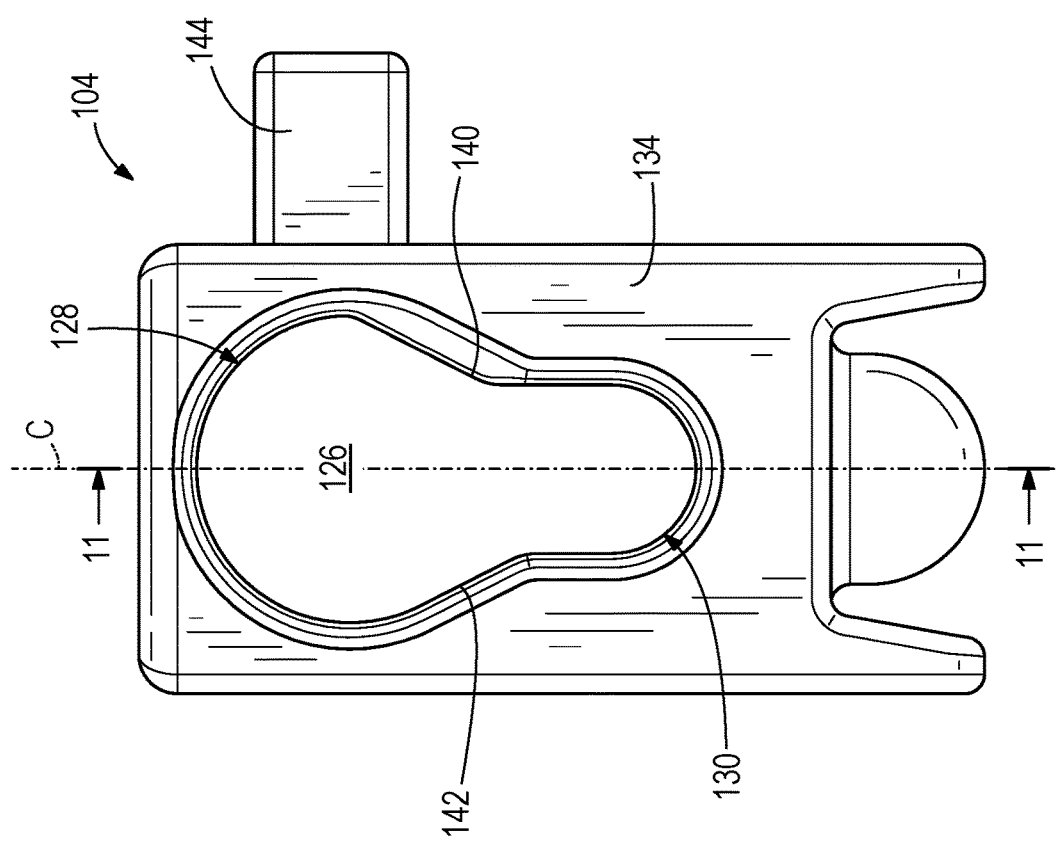
FIG. 10 is a front view of a second embodiment of a plunger device according to the present disclosure.
Figure 12:
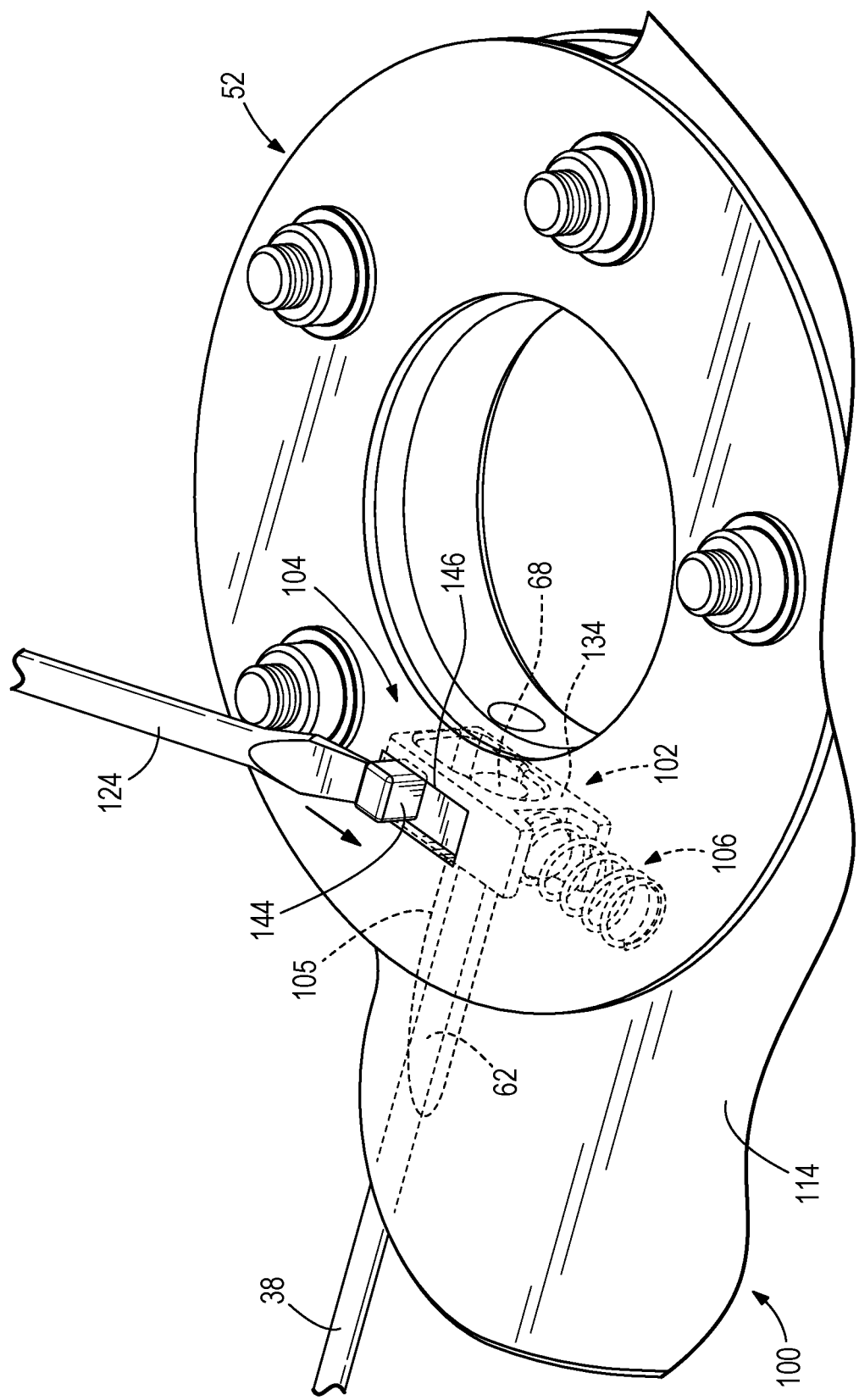
FIG. 12 is a perspective view of the second embodiment, depicting use of the manual tool to uncouple the pulley cable from the rotatable pulley member.

Referring to FIGS. 10 and 11, an alternate embodiment of the plunger body 104 has a post 144 that radially extends from a side of the plunger body 104. The post 144 extends through an elongated slot 146 formed in one of the pair of opposing cam plates 114. Referring to FIG. 12, the post 144 is manually movable in the elongated slot 146, or for example by the manual tool 124 to thereby move the plunger body 104 into the second position (FIG. 5) against the bias of the biasing device 106. The post 144 also helps prevent an incorrect installation of the plunger body 104 into the elongated cavity 112, similar to the shoulder configuration described herein above.

Advantageously, the present disclosure thus provides means for coupling an end portion of a pulley cable to a rotatable pulley wheel, wherein the pulley cable can be conveniently attached to and removed from the pulley wheel without the need for disassembly of the pulley wheel. The presently disclosed plunger and spring combination ensures a secure attachment of the free end portion of the pulley cable and prevents jamming or false engagement, i.e. where it appears to the technician that the end portion of the pulley cable is securely attached but in fact is not. The unique configuration of the keyhole aperture creates an instability wherein the enlarged free end portion of the pulley cable will either become clearly secured or clearly separated from the plunger body, thus alerting the technician of the actual connection status of the pulley cable and pulley wheel. In particular the combination of the funnel shape of the keyhole aperture and the non-symmetrical edges of the keyhole aperture create the noted instability of the enlarged end of the pulley cable.

The present disclosure thus provides an exercise apparatus comprising a resistance mechanism configured to resist an exercise motion undertaken by a user of the exercise apparatus; a rotatable pulley member; a pulley cable having a first end portion coupled to the resistance mechanism and a second end portion coupled to the rotatable pulley member; a user operable member that is operably coupled to the pulley member such that movement of the user operable member during the exercise motion rotates the pulley member and thereby pulls on the pulley cable, which in turn is resisted by the resistance mechanism; and a plunger device facilitating coupling and uncoupling of the pulley cable to and from the rotatable pulley member, wherein the plunger device is movable into a first position in which the pulley cable is coupled to the rotatable pulley member and into a second position in which the pulley cable is uncoupled from the rotatable pulley member.

In certain examples disclosed herein the second end portion of the pulley cable comprises an enlarged end having a larger width than the pulley cable; and wherein the enlarged end is engaged with the plunger device in the first position and wherein the enlarged end is disengaged from the plunger device in the second position. The plunger device can comprise a plunger body and a biasing device that biases the plunger body into the first position. The biasing device can comprise a spring. The spring can be a compression spring having a first end engaged with the plunger body and a second end engaged with the rotatable pulley member. The plunger body is disposed in an elongated cavity and the plunger body is biased towards a first end of the elongated cavity by the biasing device and movable towards a second end of the elongated cavity against the bias of the biasing device.

In certain examples disclosed herein, the pulley member comprises a pair of opposing cam plates and wherein the elongated cavity is defined between the pair of opposing cam plates. A radial groove extends from an outer edge of the pair of cam plates to the elongated cavity, the radial groove facilitating actuation of the plunger body by a manual tool to move the plunger body into the second position, wherein the biasing device biases the plunger body back towards the first position. The plunger body comprises a post that radially extends through an elongated slot formed in one of the pair of opposing cam plates, wherein the post is manually movable in the elongated slot to thereby move the plunger body into the second position, and wherein the biasing device biases the plunger body back towards the first position.

In certain examples disclosed herein, the plunger body comprises a keyhole aperture having a first end through which the enlarged end of the pulley cable is free to pass and a second end through which the enlarged end of the pulley cable cannot pass. The plunger body comprises a rear surface that engages with the enlarged end of the pulley cable in the first position and a front surface located opposite the rear surface. The rear surface is located in a cavity formed in the plunger body, such that the enlarged end of the pulley cable is located in the cavity when the pulley cable is coupled to the rotatable pulley member. The keyhole aperture comprises a funnel portion located between the first end and second end of the keyhole aperture, the funnel portion comprising opposing first and second tapered sides that taper inwardly towards each other from the first end of the keyhole aperture to the second end of the keyhole aperture. The first and second tapered sides are non-symmetrical with respect to a center axis extending through first and second ends of the keyhole aperture. The first tapered side has a narrower edge than the second tapered side. The first tapered side is tapered at a greater angle from the first end of the keyhole aperture to the second end of the keyhole aperture compared to the second tapered side.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

What is claimed is:

1. An exercise apparatus comprising:
    a resistance mechanism configured to resist an exercise motion undertaken by a user of the exercise apparatus;
    a rotatable pulley member;
    a pulley cable having a first end portion coupled to the resistance mechanism and a second end portion coupled to the rotatable pulley member;
    a user operable member that is operably coupled to the rotatable pulley member such that movement of the user operable member during the exercise motion rotates the rotary pulley member and thereby pulls on the pulley cable, which in turn is resisted by the resistance mechanism; and
    a plunger device facilitating coupling and uncoupling of the pulley cable to and from the rotatable pulley member, wherein the plunger device is movable into a first position in which the pulley cable is coupled to the rotatable pulley member and into a second position in which the pulley cable is uncoupled from the rotatable pulley member, wherein the second end portion of the pulley cable comprises an enlarged end having a larger width than the pulley cable; and wherein the enlarged end is engaged with the plunger device in the first position and wherein the enlarged end is disengaged from the plunger device in the second position.

2. The exercise apparatus according to claim 1, wherein the plunger device comprises a plunger body and a biasing device that biases the plunger body into the first position.

3. The exercise apparatus according to claim 2, wherein the plunger body comprises a keyhole aperture having a first end through which the enlarged end of the pulley cable is free to pass and a second end through which the enlarged end of the pulley cable cannot pass.

4. The exercise apparatus according to claim 3, wherein the plunger body comprises a rear surface that engages with the enlarged end of the pulley cable in the first position and a front surface located opposite the rear surface.

5. The exercise apparatus according to claim 4, wherein the rear surface is located in a cavity formed in the plunger body, such that the enlarged end of the pulley cable is located in the cavity when the pulley cable is coupled to the rotatable pulley member.

6. The exercise apparatus according to claim 3, wherein the keyhole aperture comprises a funnel portion located between the first end and second end of the keyhole aperture, the funnel portion comprising opposing first and second tapered sides that taper inwardly towards each other from the first end of the keyhole aperture to the second end of the keyhole aperture.

7. The exercise apparatus according to claim 6, wherein the first and second tapered sides are non-symmetrical with respect to a center axis extending through first and second ends of the keyhole aperture.

8. The exercise apparatus according to claim 6, wherein the first tapered side has a narrower edge than the second tapered side.

9. The exercise apparatus according to claim 6, wherein the first tapered side is tapered at a greater angle from the first end of the keyhole aperture to the second end of the keyhole aperture compared to the second tapered side.

10. The exercise apparatus according to claim 2, wherein the plunger body is disposed in an elongated cavity in the rotatable pulley member and wherein the plunger body is biased towards a first end of the elongated cavity by the biasing device and movable towards a second end of the elongated cavity against the bias of the biasing device.

11. The exercise apparatus according to claim 10, wherein the rotatable pulley member comprises a pair of opposing cam plates and wherein the elongated cavity is defined between the pair of opposing cam plates.

12. The exercise apparatus according to claim 11, further comprising a radial groove extending from an outer edge of the pair of cam plates to the elongated cavity, the radial groove facilitating actuation of the plunger body by a manual tool to move the plunger body into the second position, wherein the biasing device biases the plunger body back towards the first position.

13. The exercise apparatus according to claim 11, wherein the plunger body comprises a post that radially extends through an elongated slot formed in one of the pair of opposing cam plates, wherein the post is manually movable in the elongated slot to thereby move the plunger body into the second position, and wherein the biasing device biases the plunger body back towards the first position.

14. The exercise apparatus according to claim 2, wherein the biasing device comprises a spring.

15. The exercise apparatus according to claim 14, wherein the spring is a compression spring having a first end engaged with the plunger body and a second end engaged with the rotatable pulley member.

16. An assembly for attaching a resistance mechanism to an exercise apparatus, the assembly comprising:
   a pulley cable having a first end portion for being coupled to the resistance mechanism and a second end portion for being coupled to the exercise apparatus; and
   a plunger device facilitating coupling and uncoupling of the pulley cable to and from the exercise apparatus;

wherein the plunger device is movable into a first position relative to the exercise apparatus and in which the plunger device couples the pulley cable to the exercise apparatus, and the plunger device being movable into a different, second position in which the plunger device uncouples the pulley cable from the exercise apparatus, wherein:

the second end portion of the pulley cable comprises an enlarged end having a larger width than the pulley cable; and wherein the enlarged end is engaged with the plunger device in the first position and wherein the enlarged end is disengaged from the plunger device in the second position;

the plunger device comprises a plunger body that extends from front to back in an axial direction, from a first end to a second end in a longitudinal direction that is perpendicular to the axial direction, and from a first side to a second side in a transverse direction that is perpendicular to the axial direction and perpendicular to the longitudinal direction; and the plunger body comprises a keyhole aperture axially extending through the plunger body, the keyhole aperture comprising a first end through which the enlarged end of the pulley cable is free to pass and a second end through which the enlarged end of the pulley cable cannot pass.

17. The assembly according to claim 16, wherein:
the keyhole aperture comprises a funnel portion located between the first end and second end of the keyhole aperture, the funnel portion comprising opposing first and second tapered sides that taper inwardly towards each other from the first end of the keyhole aperture to the second end of the keyhole aperture; and the first and second tapered sides are non-symmetrical with respect to a longitudinal center axis extending through first and second ends of the keyhole aperture.

18. The exercise apparatus according to claim 17, wherein the first tapered side has a narrower edge than the second tapered side.

* * * * *